April 15, 1969 J. R. WHITEHURST 3,438,252
INSTRUMENT FOR MEASURING PRESSURE ON ROLLERS
Filed July 5, 1966 Sheet 2 of 3
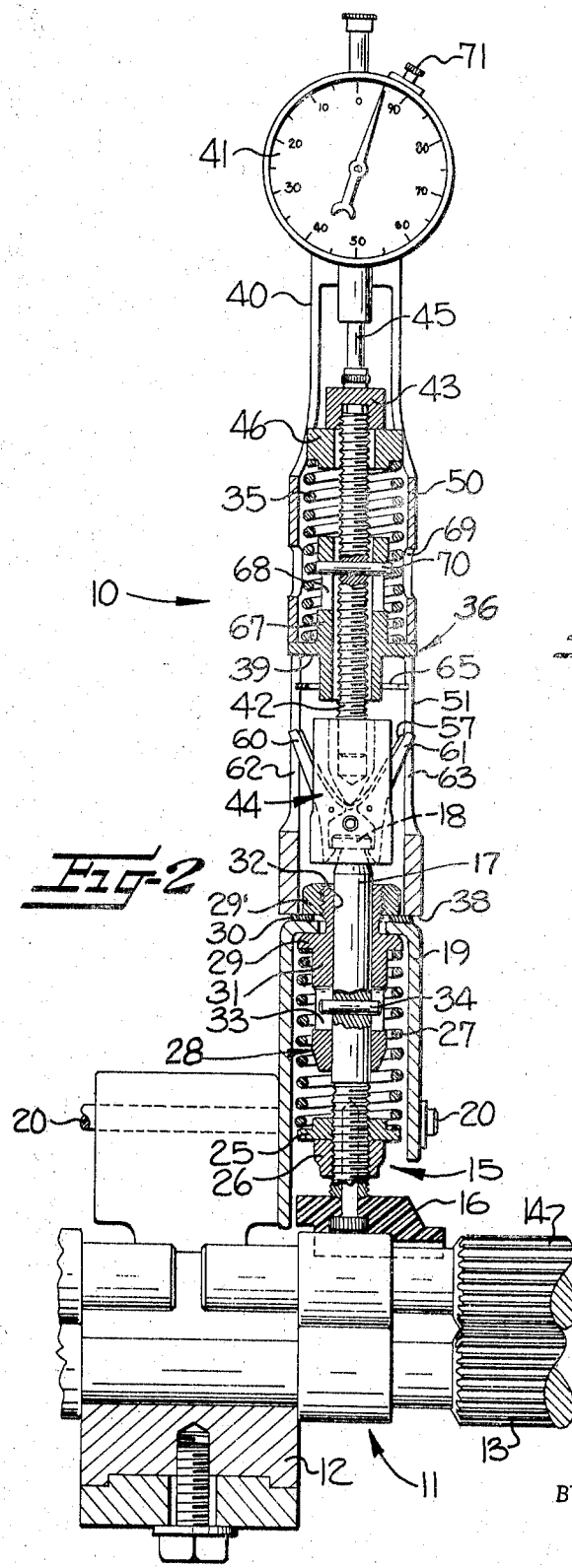
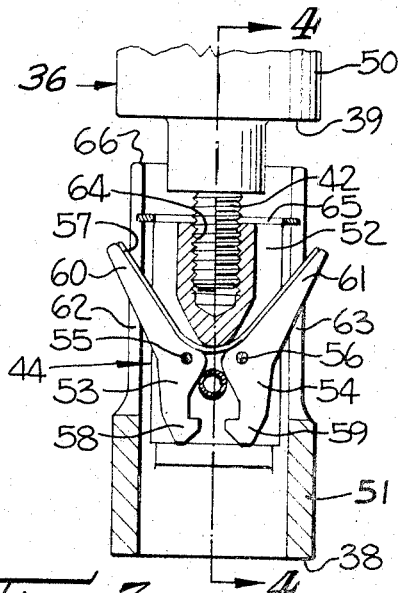
Fig-3
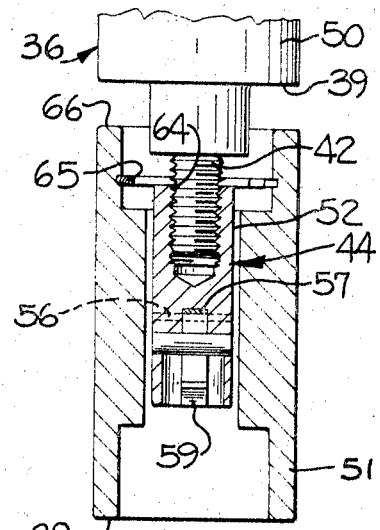
Fig-4
INVENTOR:
JOE R. WHITEHURST
BY Parrott, Bell, Seltzer, Park & Heard
ATTORNEYS April 15, 1969

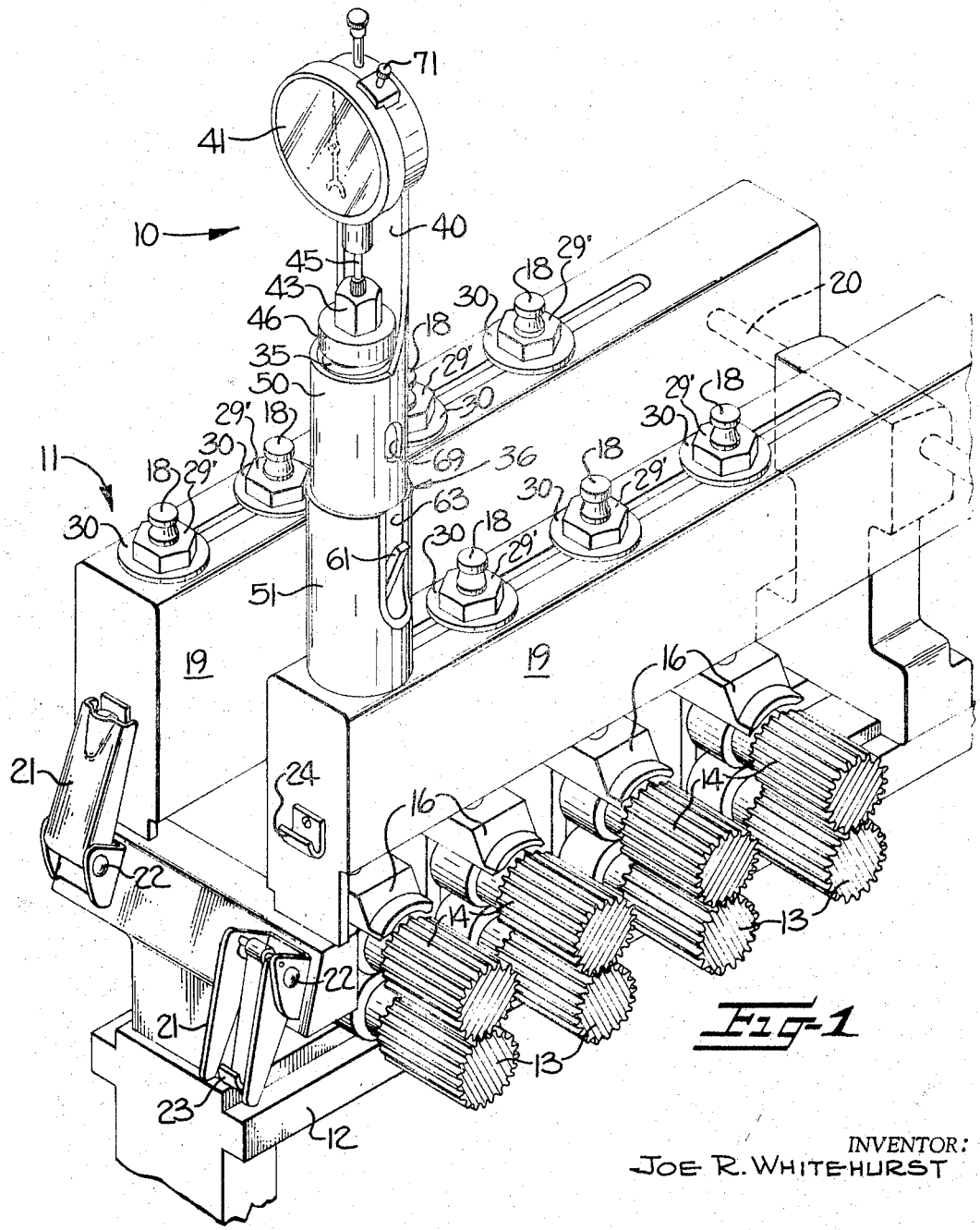

J. R. WHITEHURST 3,438,252

INSTRUMENT FOR MEASURING PRESSURE ON ROLLERS

Filed July 5, 1966

INVENTOR:
JOE R. WHITEHURST

BY Parrott, Bell, Seltzer, Park & Heard

ATTORNEYS

United States Patent Office 3,438,252
Patented Apr. 15, 1969

3,438,252
INSTRUMENT FOR MEASURING PRESSURE ON ROLLERS
Joe R. Whitehurst, Bessemer City, N.C., assignor, by mesne assignments, to The Warner & Swasey Company, Cleveland, Ohio, a corporation of Ohio
Filed July 5, 1966, Ser. No. 562,644
Int. Cl. G01l 5/12
U.S. Cl. 73—141                                                         11 Claims

ABSTRACT OF THE DISCLOSURE

An instrument for obtaining an indication of the pressure applied to a live pressure member, such as a top drafting roll, by a deformable pressure element normally deformed by a latched releasable member, wherein a testing spring is carried by a frame adapted to engage the releasable member, with a movable means engaging one end of the spring and being detachably connectable to the pressure element in such a manner that, upon release of the releasable member, the full force of the deformable pressure element is transmitted to and deforms the testing spring. Gauge means senses and provides a visual indication of the extent of deformation of the testing spring by the deformable pressure element, and thus serves to indicate the pressure applied to the live pressure member when the releasable member was latched.

---

This invention relates to textile machines of a type including a roller forced against a reaction member under controlled pressure. More specifically, it relates to mensuration of such controlled pressure.

Textile machines of this type cover a broad spectrum of operations. For example, some carding machines include a live calender roller forced against a fixed calender roller under high controlled pressure. Some pickers are similarly equipped. Roving frames, drafting frames, and spinning frames additionally represent a rich field for applications of this invention. They include live pressure members forced against fixed reaction members under high controlled pressure. The reaction members may vary in format, being rollers fixedly journaled in a frame in one instance, or aprons trained over rollers fixedly journaled in a frame in a second instance. Whatever the basic arrangement, the live pressure members are forced against the corresponding reaction members by pressure devices. The pressure devices may take various forms. Some of them take the form of dead weights suspended by appropriate linkages from the live pressure members. More recently, more sophisticated systems have been adapted to this function. Such things as pneumatic bladders, expandable bellows, and most particularly, springs, have been interposed between frame members and the live pressure members to exert the requisite pressure on the live pressure members. These most recent systems, generically described herein as those including a dimensionally deformable elastic element as the pressure source, have proven superior to the old dead weight systems in many respects. They have, however, posed a problem which has not heretofore been satisfactorily resolved.

With the old dead weight system, it was a simple matter to determine the pressure actually applied to the live pressure member. It was only necessary to note the size of the dead weight and to note the mechanical advantage of whatever linkage was employed. With this data, it was a simple matter to calculate the actually applied pressure.

With the advent of the more recent elastic-element systems, the problem became more complex, and yet it remained of ever-increasing importance to proper treatment of textiles that the pressure actually applied be carefully measured and maintained within defined limits. This invention relates to an instrument and method useful for attainment of that purpose.

Earlier attempts to measure the pressure actually applied by elastic-element systems have taken many forms, with mixed degrees of success and drawbacks.

One technique was to employ springs of known spring constants as the elastic elements. Adjustment means were used in the mountings of the springs to vary their confinement when in pressure-applying position. The adjustment means bore indicia showing the extent of spring confinement at each setting, therefore theoretically showing the pressure actually being applied thereby. The weakness of this arrangement was that, since the springs were in active use as pressure sources, the attendant vibration, etc. under continuous long-term load conditions caused the spring constants to vary with age. Such things as metal fatigue, crystallization, etc. contributed to this variance. Moreover, the change of spring constant was not reliably predictable. Thus this system was lacking in reliability.

Another technique was that shown in U.S. Patent No. 2,992,555. Briefly, it involved the removal of the live pressure member and substitution therefor in the same linkage of a specially made test roll, linking the test roll with the same pressure device which had applied the pressure to the live pressure member. By using the same linkage, it became possible to measure the deflection of the shaft of the test roll caused by the actually applied pressure, and to thereby determine the extent of that pressure with excellent accuracy. However, this system proved inconvenient and time-consuming in use. The removal of a top roll and substitution of a test roll was especially vexing. In view of the large number of pressures requiring measurement, the time consumption in particular was prohibitive. Moreover, it was necessary that for each different style or type of pressure member, a separate test roll be provided. This necessitated provision of a goodly number of test rolls, and careful cross-coding to match a particular test roll with the style or type of unit being evaluated. For these and other similar reasons, this technique, though reliable, failed to achieve widespread acceptance in the industry.

Another technique was that exemplified by Polish Patent No. 45,486. This took the form of a mounting for a carefully calibrated spring, amounting to a spring scale. The spring scale was mounted in position to oppose the device applying the pressure to a live pressure member while the pressure was being applied. Lost motion was taken up and a zero position noted. Then a screw was gradually tightened, compressing the calibrated spring and moving a pointer on a measuring device according to the extent of the compression. Tightening of the screw continued until the operator noted that the live pressure member and the fixed reaction member had begun to move apart. At that point, it was deduced that the compression on the calibrated spring was in precise balance with the pressure originally applied to the live pressure member. Thus a reading on the measuring device of the extent of compression of the calibrated spring necessary to achieve this balance amounted to a reading of the pressure actually applied.

This technique had certain disadvantages. Among these was the necessity of relying upon operators of widely varying skill for judgment of a critical and somewhat nebulous point—namely, the actual point when the live pressure member and the reaction member moved apart. Another was the inconvenient linkage necessary to properly connect the calibrated spring with the live pressure member. A further drawback was the necessarily time-consuming tightening of the calibrated spring. This required great care in execution, since the balance to be achieved was necessarily delicate if results were to be of value. What may be a more important drawback, however, is of origin different from these. For the measurement to even have purpose, the pressure actually applied must be regulatable to conform with the desired standard pressure applicable to that portion of the textile process where the measurement is being taken. With the described technique, regulation must be done on a trial and error basis. After first measuring and thus determining that the pressure actually being applied deviates from the desired standard, it is necessary under this system to then make a tentative corrective adjustment, and to then remeasure the new pressure actually applied, making thereafter a new determination of conformity with the desired standard. This procedure must be continued until the actual pressure moves into conformity with the desired standard pressure.

While continued employment of the system of the Polish patent would possibly soon lend an operator a measure of facility at such trial and error regulation, it would be much better for obvious reasons to avoid the necessity for such a time-consuming approach to the problem.

It is accordingly an object of this invention to provide method and apparatus for readily and accurately determining the pressure actually applied to a live pressure member by a pressure device of a type including a dimensionally deformable elastic element as the source of the pressure.

It is a further object of this invention to provide method and apparatus for the purpose stated above which permit direct regulation of the pressure device into conformity with a desired standard pressure without necessity of trial and error regulation.

Yet another object of the invention is to provide a light and durable instrument for measuring the pressure mentioned above, which instrument is readily portable, simple to employ, and reliable in use, and yet requires but minimal judgment on the part of its user.

Another object of the invention is to provide an instrument easily attached to a textile drafting apparatus which, when so attached, will, upon mere release of a latched releasable member of the drafting apparatus, automatically show on a visually readable gauge any deviation between pressure actually being applied to a top roll of the drafting apparatus and the pressure desired to be applied thereto.

A specific object of the invention is to provide an instrument for measuring the pressure actually applied to a roll in the textile machine and for visually showing its comparison to a selectably predetermined standard pressure set up in the instrument, the arrangement being such that regulation of the pressure actually applied is easily accomplished while the instrument continues to show a visual comparison between the predetermined standard and the thus-regulated value of the pressure actually applied.

Some of the objects of the invention having been stated, other objects will appear as the description proceeds when taken in connection with the accompanying drawings, in which FIGURE 1 is a perspective showing of a textile drafting frame with an instrument according to the invention in place thereon;

FIGURE 2 is a sectional view looking rearwardly along the axis of the instrument in association with corresponding drafting rolls;

FIGURE 3 is a fragmentary sectional view of a detail of FIGURE 2;

FIGURE 4 is a side sectional view taken substantially along line 4—4 of FIGURE 3;

Figure 7:
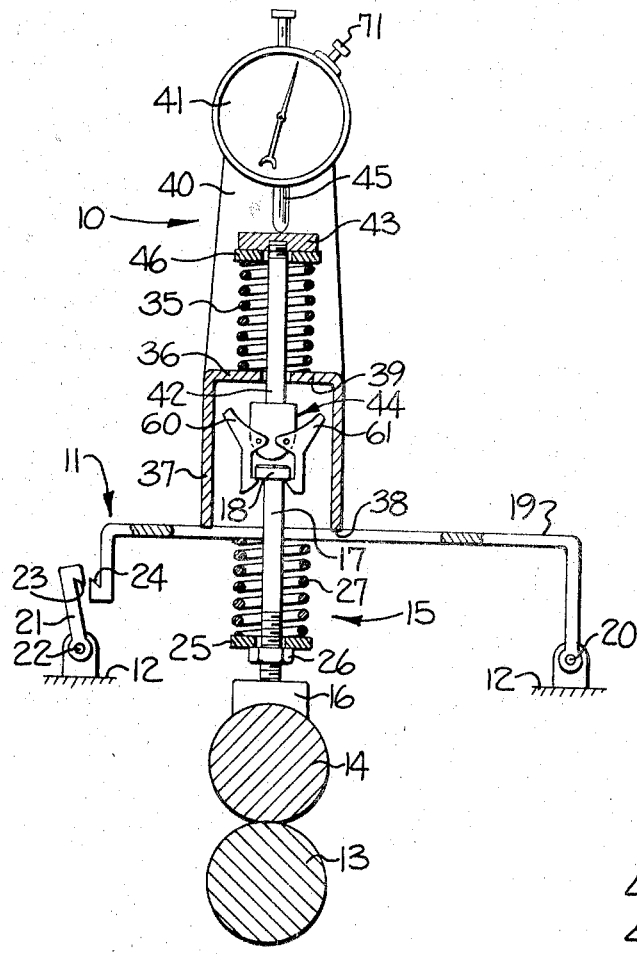
FIGURE 7 is a somewhat schematic side elevational view in partial section of an instrument according to the invention, stripped to essentials, and in place on a drafting frame.

An instrument embodying the principles of the invention is generally indicated at 10 in FIGURES 1, 2 and 7, in place on a drafting frame generally designated 11. Drafting frame 11 is conventional and is merely shown in sufficient detail to illustrate the application of the invention. In pertinent part, drafting frame 11 comprises a basic frame 12. Journaled for rotation in frame 12 are a series of fixed reaction members or lower rollers 13. Live pressure members or top rollers 14 are carried by frame 12 above lower rollers 13. Top rollers 14 are adapted to be forced against lower rollers 13 by regulatable pressure devices shown generally at 15 (FIGURES 2 and 7). The drafting frame illustrated includes a separate pressure device for each set of corresponding top and lower rollers, although an arrangement whereby one pressure device supplies pressure to several top rollers is also within the concept of this invention.

Details of one of the pressure devices are shown, stripped to the essentials, in FIGURE 7. Each pressure device 15 includes a pressure pad 16 in pressure-transmitting contact with a corresponding top roller 14. Threadably or otherwise conveniently secured to pressure pad 16 is an upwardly extending guide plunger 17. A releasable member 19 is pivotally connected to frame 12 at 20 and overlies all the rollers, as best seen in FIGURE 1. Guide plunger 17 extends freely through releasable member 19 and terminates in a reduced annular shoulder 18 located above releasable member 19. Releasable member 19 may be latched in operative position (left side of FIGURE 1), or unlatched and released (right side of FIGURE 1 and FIGURE 7). A latch 21 is provided for this purpose. A separate latch 21 may be provided for each releasable member 19 in the drafting frame. Latch 21 is pivotally connected to frame 12 at 22 and is provided with a hook 23 adapted to engage a corresponding hook 24 secured to releasable member 19. Releasable member 19 may be manually latched or released by moving latch 21 about its pivot 22, thus moving hooks 23, 24 into or out of engagement. When latched, releasable member 19 is spaced a fixed distance from lower rollers 13 and thus is spaced a fixed distance from the normal operating position of top rollers 14. A pressure collar 25 is carried in relatively adjustable relation by guide plunger 17. Adjustment means such as nut 26, threadably or otherwise conveniently secured to guide plunger 17, are provided to adjustably regulate the position of pressure collar 25 on guide plunger 17. A pressure source such as compression spring 27 is interposed between releasable member 19 and pressure collar 25. The pressure source may be any dimensionally deformable elastic element which exerts a recovery force in attempting to regain its relaxed dimensions when subjected to dimensional strain. The spring 27 has been chosen as illustrative of such elements. In the arrangement shown, the relaxed length of spring 27 is greater than the spacing between collar 25 and releasable member 19 when releasable member 19 is in latched position. Thus, when releasable member 19 is latched, spring 27 is compressed and exerts a recovery force against releasable member 19 and against pressure collar 25. Pressure collar 25 transmits the recovery force to guide plunger 17 through adjustment nut 26, plunger 17 transmits the force to pressure pad 16, and pressure pad 16 transmits the force to top roller 14, forcing it against lower roller 13 with a pressure corresponding to the extent of compression of spring 27.

By adjustment of nut 26, the spacing between pressure collar 25 and releasable member 19 in latched position can be varied. Such adjustment will vary the extent of compression of spring 27 and will correspondingly vary the recovery force exerted thereby. The actual pressure with which top roller 14 bears against lower roller 13 is directly proportional to the recovery force exerted by spring 27 and is therefore regulated by adjustment of nut 26 on guide plunger 17.

What has been discussed thus far are the essentials of the pressure device 15. Additional details have been added in the practical employment of such devices to add convenience to their general usage. FIGURE 2 shows some of these added details, beginning with provision of an elongate pilot casing 28 between guide plunger 17 and releasable member 19. Casing 28 is provided with an annular shoulder 29, which serves as a contact point for the upper end of spring 27. Casing 28 extends upwardly through releasable member 19 and is secured thereto as by nut 29' and washer 30. A reduced portion 31 of casing 28 extends downwardly from releasable member 19 and is carried within spring 27. Casing 28 has a central bore 32 dimensioned to freely slidably receive guide plunger 17 therein. Reduced portion 31 of casing 28 is slotted as at 33. A pin 34 extends laterally through plunger 17 and protrudes into slots 33 of casing 28. Slots 33 are elongate in a direction axial of plunger 17. The arrangement is such that pin 34, in conjunction with casing 28, acts as a retainer to hold pressure device 15 in loosely assembled relation whenever releasable member 19 is released. It prevents the complete relaxation of spring 27 which, as can be best seen in FIGURE 7, would otherwise cause pressure device 15 to substantially disassemble upon release of latch 21.

What has been described thus far is a conventional drafting frame with the top rollers thereof subjected to pressure by conventional spring type pressure devices. An instrument 10 according to the invention may advantageously be applied to such a conventional drafting frame to measure the applied pressure.

A simplified schematic form of instrument 10 is shown in FIGURE 7.

Instrument 10 basically comprises a testing pressure element such as testing compression spring 35. This pressure element may be any dimensionally deformable elastic element having a known recovery constant. For purpose of explanation, "recovery constant" is herein defined as the ratio of the extent of dimensional deformation of the pressure element to the extent of reactive force exerted thereby in attempting to recover its original relaxed dimensions. In the case of a spring, this characteristic is known as "spring constant" and is frequently expressed in terms of "pounds per inch," or pounds of force exerted in recovery per inch of compression or extension from its relaxed length. It is essential to instrument 10 that a pressure element or spring 35 having a recovery constant of known value be used therein.

Instrument 10 further comprises coupling means for detachably coupling spring 35 in opposition to spring 27 of the drafting frame. The coupling means is comprised of two relatively movable sections, the first such section comprising a substantially elongate body 36. Body 36 has a lower portion 37 terminating in a reference end face 38. Body 36 further includes a fixed engaging means or restraining wall 39. Wall 39 is spaced a fixed distance from reference end face 38 and defines a point of restraint for one end of spring 35. As shown, testing spring 35 extends upwardly (outwardly) from restraining wall 39 in a direction away from the reference end face 38 of the body or frame 36 of the instrument 10.

Body 36 terminates in an upper bracket portion 40, to which is secured the casing of a guage 41. Guage 41 may be of the dial and needle type, and includes a dial adjustably fixed to its casing by screw 71. Guage 41 further includes a sensing arm 45 operatively connected with the needle, with arm 45 being movable relative to the casing. The relative positions of the dial and the needle indicate the relative positions of the casing and the sensing arm 45.

The second section of the coupling means is illustrated as a testing plunger 42 extending through wall 39 of body 36 for freely slidable movement relative thereto. A pressure cap 43 is secured to the upper end of plunger 42. Secured to the lower end of plunger 42 is a connecting means 44. Connecting means 44 may take the form of gripper means adapted to positively grip the reduced annular shoulder 18 of guide plunger 17 of the drafting frame. Spring 35 is interposed between restraining wall 39 of body 36 and pressure cap 43 of plunger 42. Sensing arm 45 of guage 41 moves with pressure cap 43.

Pressure cap 43 may itself restrain the upper end of spring 35. Optionally, and for a reason to be hereinafter described, a spacer collar 46, serving as a movable means, is preferably interposed between pressure cap 43 and the upper end of spring 35, as illustrated.

The instrument illustrated in FIGURE 7 operates in the following fashion, beginning with releasable member 19 of the drafting frame in its latched position: instrument 10 is first coupled to the drafting frame. To accomplish the coupling, reference end face 38 of body 36 is brought into contact with latched releasable member 19. Gripping means 44 is moved to engage annular shoulder 18 of guide plunger 17 of the drafting frame. This motion lightly compresses spring 35 to an extent sufficient to remove lost motion. The dial of guage 41 is then adjusted to read with the needle a preset number. Following the coupling action, latch 21 is released, thereby unlatching and releasing releasable member 19. This causes spring 27 to force pressure collar 25 and releasable member 19 apart, since latch 21 no longer prevents such motion. The effect of this motion is to pull annular shoulder 18 of guide plunger 17 closer to releasable member 19. Since one end of spring 35 is in contact with restraining wall 39 of body 36 and is therefore spaced a predetermined distance from releasable member 19, the motion must be expressed by pulling plunger 42 of instrument 10 downwardly. Spring 35 is thereby compressed by pressure cap 43 bearing against its upper end. Since arm 45 moves with cap 43, guage 41 measures or indicates the extent of the compression of spring 35 effected by release of releasable member 19. A point will be quickly reached where the forces stabilize; that is, when the compression of spring 35 resulting from the release of releasable member 19 comes into balance with the force exerted by spring 27. Since the recovery constant of spring 35 is known, the linear distance of compression of spring 35 as read on gauge 41 is a direct indication of the pressure, or compression, necessary in spring 35 to balance that of spring 27. This pressure corresponds to that which spring 27 had exerted against roll 14 when releasable member 19 was latched.

Since spring 35 is of known recovery constant, the degree of compression that will be expressed therein by a known pressure exerted by spring 27, is predictable. Therefore, instrument 10 can be arranged to take advantage of this predictability. The operator of the instrument knows the pressure which it is desired that spring 27 exert against top roller 14. This is herein termed as the desired standard pressure. With this information, he can adjust the dial of gauge 41 such that, if in fact spring 27 is exerting a pressure equal to the desired standard pressure, then release of the releasable member will cause spring 35 to be compressed to a release-effected extent of a magnitude such that the gauge will move to a zero reading. Therefore, when the measuring procedure is followed and releasable member 19 released, the deviation of the reading of gauge 41 from zero indicates the deviation of the pressure actually exerted by spring 27 from the pressure it is desired that spring 27 exert. Thus, with the instrument 10 still in place and giving an instantaneous measurement of the applied pressure by spring 27, the position of nut 26 on guide plunger 17 can be adjusted until gauge 41 actually does read zero. At that point, spring 27 will have been adjusted so that it will exert a pressure on roll 14 equal to the desired standard pressure.

It is a known idiosyncrasy of springs, even those carefully calibrated, that the spring constant does not follow a strictly linear relation to the degree of extension or compression as the case may be. With increase in magnitude of the deformation of the spring, the relation begins to assume curvilinear aspects. It is to compensate for this curvilinear "constant" that spacer washer 46 is provided, limiting the range of actual movement of spring 35 to a substantially linear segment of its "spring constant" curve. Limiting the range of actual movement in this fashion has the additional advantage of providing a conveniently compact range of gauge readings. Use of this spacer washer additionally provides a further advantage, as will be obvious from the discussion hereinafter. By selecting the thickness of spacer 46 to be of a predetermined dimension, spring 35 can be preliminarily compressed by the mere act of coupling instrument 10 to the drafting frame with releasable member 19 latched. Then, upon subsequent release of releasable member 19, the extent of compression of spring 35 necessary to balance the pressure exerted by spring 27 will be reduced by the amount of preliminary compression on spring 35. Thus, the variables, i.e., the difference between the pressure actually exerted by spring 27 and the pressure it is desired that it exert, will still be readable on gauge 41. It will merely be reduced by a preset amount corresponding to the thickness of spacer washer 46. Thus, the entire action will take place over a reduced extent of compression of spring 35. In following up on this point, I have discovered that the thickness of spacer 46 necessary or requisite to a particular desired value of the pressure of spring 27 can best be determined empirically. This is probably due to the non-linear characteristics of the spring constant mentioned above. I have, therefore, provided a set of spacer washers 46, each marked with the desired pressure of spring 27 with which that particular spacer washer 46 should be used in the instrument. In making this empirical determination of dimensions, I have gone one step further. I have dimensioned each spacer washer in the set such that, when it is in place to preliminarily compress spring 35, release of releasable member 19 of the drafting frame will, if spring 27 is adjusted to deliver the precisely correct pressure to top roller 14, cause movement of the needle on gauge 41 to be deflected .010 inch. Each spacer washer 46 is thus marked with the desired standard pressure which it is intended to measure.

The operation is thus as follows: assuming that a particular top roller 14 is intended to be subjected to pressure from its spring 27 amounting to 16 pounds, a spacer washer 46 marked 16 pounds is inserted in instrument 10 between pressure pad 43 and the top of spring 35. With releasable member 19 of the drafting frame in latched position, instrument 10 is coupled to the pressure device. That is, reference end face 38 is brought firmly against releasable member 19 and spring 35 is compressed until gripper means 44 is positively connected to annular shoulder 18 of guide plunger 17. The dial of gauge 41 is then adjusted to read .010 inch. The next step is to release latch 21. If the gauge dial then moves to a zero reading, this means that spring 27 was already properly regulated. If it does not then read zero, the operator needs merely to adjust nut 26 on guide plunger 17 until the dial does read zero. When the zero reading is obtained, spring 27 has thereby been regulated such that upon removal of the instrument and resumption of normal function of the drafting frame (i.e., by relatching releasable member 19 with latch 21), spring 27 will cause top roller 14 to bear against lower roller 13 with 16 pounds of pressure.

Figure 5:
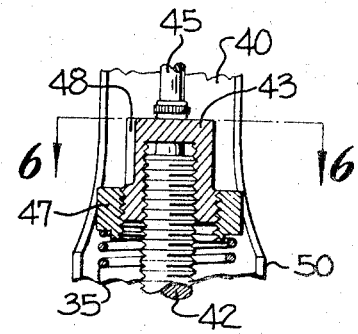
FIGURE 5 is a fragmentary sectional view of an embodiment of a portion of FIGURE 2.
Figure 6:
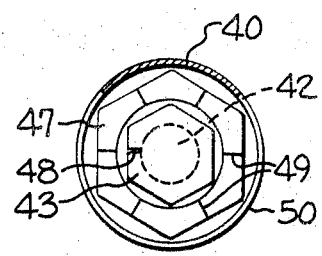
FIGURE 6 is a top sectional view of the embodiment of FIGURE 5 taken along line 6—6 thereof.

The above arrangement has been discussed utilizing a set of interchangeable spacer washers 46. FIGURES 5 and 6 show a possible variant which will still attain the objectives of this invention. In this variant, pressure cap 43 carries in threaded engagement on its exterior an adjustable spring contacting element 47. Pressure cap 43 bears a single index mark 48 as shown. By rotating element 47 relative to pressure cap 43, the spacing between the upper surface of pressure cap 43 and the lower spring contacting surface of element 47 can be varied. Element 47 is provided on its upper surface with a plurality of index marks 49. The relation of index marks 49 to the single index mark 48 on pressure cap 43 shows the relative adjustment between pressure cap 43 and element 47, thus showing the spacing between the upper surface of the cap and the lower surface of element 47. This spacing is the effective gross thickness of pressure cap 43. Thus, it is clear that the effective thickness of pressure cap 43 can be varied as desired. The effect is similar to the employment of spacer washers. Index marks 49 can be denominated in terms of the pressure desired to be applied.

FIGURE 7 has shown the essentials of an instrument according to the invention. FIGURES 2, 3 and 4 show a more practical version of an instrument embodying the principles disclosed in FIGURE 7. Various details adding to the convenience of the instrument have been added.

Body 36 of FIGURE 7 or frame 36 in FIGURES 1–4 and a two-part unit comprises an upper body 50 and a lower body 51. Lower body 51 comprises housing means for the gripper 44. It is lower body 51 that includes the reference end face 38.

A particular design of gripper means 44 is shown in detail in FIGURES 3 and 4. It comprises a mounting block 52. A pair of gripping jaws 53, 54, pivotally mounted on mounting block 52 at 55, 56, are urged into closed position at their lower portions 58, 59, by a leaf spring 57. Lower portions 58, 59 are shaped for positive gripping action on reduced annular shoulder 18 of guide plunger 17, as best shown in FIGURE 2. The upper ends of jaws 53, 54 comprise extended levers 60, 61. The arrangement is such that manipulation of levers 60, 61 causes jaw portions 58, 59 to be readily separated by pivoting members 53, 54 about pivots 55, 56.

Gripper means 44 is housed in lower body 51. Body 51 includes slots 62, 63 extending substantially lengthwise of body 51. The action of slots 62, 63 on levers 60, 61 also permits handling of body 51 and gripper means 44 as a single unit when rotated for purposes hereinafter described. Mounting block 52 of gripper 44 is internally threaded as shown at 64 to threadably receive the lower end portion of plunger 42. A lock ring 65 is provided within body 51, limiting upward travel of gripper means 44 relative to body 51, and thereby holding body 51 and gripper 44 loosely assembled even when mounting block 52 is removed from plunger 42. Body 51 terminates in an upper end face 66, the function of which will appear hereinafter.

Upper body 50 houses spring 35. Restraining wall 39 is integrally secured as by welding or the like to upper body 50, and includes an upwardly extending boss portion 67. Boss portion 67 rides within spring 35, acting as a pilot for the interior thereof, and is provided with elongate slots 58 in its walls. Corresponding access slots 69 are provided in the walls of body 50. Plunger 42 extends longitudinally of body 50 and interiorly of boss 67, and is freely movable relative thereto. A pin 70 extends laterally through plunger 42 with distal end portions extending into slots 68. Pin 70 may be removed by access through slots 69 of body 50 if desired. When in place, pin 70, cooperating with slots 68, holds the upper body 50, spring 35, and plunger 42 loosely assembled, yet allows relative longitudinal movement thereof limited only by the extreme limits of slot 68. Pressure cap 43 is threadably, and thereby removably, secured to the upper end of plunger 42, as illustrated. Spacer means 46, if used, is interposed between pressure cap 43 and the upper end of spring 35, again as illustrated.

When assembled for use, lower body 51 and upper body 50 are connected to act as one body. Mounting block 52 of gripper means 44 is threaded onto the lower end of plunger 42 and tightened until upper end face 66 of body 51 is in intimate contact with the undersurface of restraining wall 39 (FIGURE 2). This establishes a fixed distance between restraining wall 39 and reference end face 38. Thus, the action is the same as it was in the stripped-down version of the invention shown in FIGURE 7.

The invention as shown in FIGURE 2 may conveniently be used as follows: with releasable member 19 of the drafting frame carrying the top roller whose pressure is to be measured being in position and latched, lower body member 51 of instrument 10 is loosened or adjusted by turning it relative to plunger 42. As thus loosened, it is a simple matter, not requiring the overcoming of any spring, to permit gripper means 44 to loosely surround and lightly grasp the reduced annual shoulder 18 of guide plunger 17. With lower body 51 and gripper 44 thus in place, the upper body 50 of the instrument and the plunger 42 are tightened on the lower body 51 and mounting block 52 as heretofore discussed. Tightening of the threaded end of plunger 42 into mounting block 52 continues until upper end face 66 of lower body 51 moves into intimately tight contact with restraining wall 39. When that point is reached, a datum position has been established. The dial of gauge 41 is then adjusted to indicate that datum position. Conveniently, provided spacer washers 46 are dimensioned as heretofore discussed, the dial will thereby be adjusted to read .010 inch. Next, latch 21 is rotated (counterclockwise in FIGURE 7) to unlatch and release releasable member 19. This action will cause spring 35 to be compressed by the relaxation of spring 27, accordingly causing pressure cap 43 to move relative to body 50. Sensing arm 45 of gauge 41 will follow that movement. If the pressure being applied by spring 27 happens to equal the pressure desired to be applied thereby, the gauge will then move to a zero reading. If it moves to a reading other than zero, the operator simply turns adjusting nut 26 of the pressure device 15 until the dial needle does move to zero. With this adjustment, the pressure applied by spring 27 has been adjusted to the desired standard. Having thus measured and regulated the pressure of spring 27, the operator now merely depresses lever members 60, 61, thereby releasing the instrument from the drafting frame. By latching releasable member 19 back in operative position, the job is finished.

In the drawings and specification there has been set forth a preferred embodiment of the invention and, although specific terms are employed, they are used in a generic and descriptive sense only and not for purposes of limitation, the scope of the invention being defined in the claims.

I claim:
1. An instrument for obtaining an indication of the pressure actually applied to a live pressure member by a pressure device having a first compression spring, first engaging means on one end of said spring engageable with said live pressure member, a latched releasable member having means engaging the other end of said spring and normally compressing the same at a fixed distance from the normal operating position of said live pressure member, and a guide plunger extending through said spring and having one end connected to said engaging means and its other end extending through said releasable member; said instrument comprising
 a frame adapted to have one of its ends positioned against said releasable member and having a fixed engaging means in a medial portion thereof,
 a testing compression spring having one end engaging said fixed engaging means and extending outwardly in a direction away from said one end of said frame,
 movable engaging means engaging the outer end of said testing spring and having a testing plunger connected thereto and extending through said testing spring and toward said one end of said frame,
 means adapted for releasably connecting said testing plunger to said other end of said guide plunger independently of said live pressure member,
 said testing spring being adapted to be compressed and thereby deformed by the force of said first compression spring upon release of said releasable member permitting expansion of said first spring and consequent displacement of said plungers therewith, and gauge means operatively associated with said movable means to indicate the extent of deformation of said testing spring by said first spring and thus to serve as an indication of that pressure actually applied to said live pressure member when said releasable member was latched.

2. An instrument according to claim 1, including limiting means operatively connecting said testing plunger to said fixed engaging means to limit outward movement of said testing plunger relative to said fixed engaging means, and said movable engaging means comprising spacer means engaging said outer end of said testing spring and restrained from outward movement on and relative to said testing plunger.

3. An instrument according to claim 2, wherein said gauge means is carried by said frame and includes a sensing arm movable with said testing plunger for indicating the extent of relative motion between said frame and said testing plunger.

4. An instrument according to claim 2, in which said spacer means is restrained from outward movement on said testing plunger by securing means threaded to the outer end of said testing plunger.

5. An instrument according to claim 4, in which said securing means engages the outer end surface of said spacer means, wherein means is provided for limiting the extent to which said securing means can be threaded onto the outer end of said testing plunger and thereby providing a predetermined distance between said securing means and said first-named limiting means, and wherein the thickness of said spacer means is such with respect to the length of said testing spring that said testing spring is compressed to a predetermined extent by said spacer means independently of said first compression spring.

6. An instrument according to claim 5, wherein said spacer means comprises at least one of a set of readily interchangeable washers of various predetermined thicknesses.

7. An instrument according to claim 4, wherein said securing means includes means for limiting the extent to which said securing means can be threaded onto said testing plunger and thereby providing a predetermined distance between said securing means and said first-named limiting means, said spacer means being adjustably secured to said securing means for adjustment axially of said testing plunger relative to said securing means such that said spring can be preloaded and thus preliminarily deformed by adjustment of said spacer means toward said first-named limiting means, and said securing means and said spacer means bearing cooperating indicia reflecting their state of relative adjustment and thereby the extent of preliminary deformation effected by said spacer means being thus adjusted.

8. An instrument according to claim 1, in which said guide plunger has an annular shoulder on its said other end; said means adapted for releasably connecting said testing plunger to said other end of said guide plunger comprising movable gripper jaws carried by said testing plunger and adapted for movement into and out of gripping engagement with the annular shoulder of said guide plunger.

9. An instrument according to claim 8, including means adjustably connecting said jaws to said testing plunger for axial adjustment thereon and relative to said frame.

10. An instrument according to claim 8, wherein said frame comprises a first body to which said fixed engaging means is securely attached and a second body of tubular form having one end engageable with said first body and whose other end is adapted to occupy a fixed position against said releasable member,
 means restraining said testing plunger from rotation relative to said first body,
 means axially adjustably connecting said gripper jaws to said testing plunger including a mounting block located within said second body and threaded to said other end of said plunger and pivotally supporting said jaws, spring means normally biasing said jaws into a gripping relationship, and means substantially preventing relative rotational movement between said block and said second body while allowing relative axial movement between said block and said second body such that said jaws may be adjusted axially of said testing plunger by manual rotation of said second body relative to said first body to properly position said jaws in engagement with the annular shoulder on said guide plunger and to thereby remove any slack between said plungers while the releasable member is in latched condition.

11. An instrument according to claim 10, in which said second body is provided with at least one longitudinally extending slot therein, and wherein said means substantially preventing relative rotational movement between said block and said second body includes an extended lever on at least one of said jaws extending outwardly from said block and into said slot.

References Cited

UNITED STATES PATENTS 2,992,555  7/1961  Butler.

FOREIGN PATENTS 45,486  2/1962  Poland.
1,037,767  8/1966  Great Britain.
1,042,923  9/1957  Germany.

RICHARD C. QUEISSER, *Primary Examiner.*

CHARLES A. RUEHL, *Assistant Examiner.*